May 26, 1953  W. K. FOULKE  2,639,935
GARDEN TOOL
Filed March 10, 1948

INVENTOR
WILLIAM K. FOULKE
BY G. H. Braddock
ATTORNEY

Patented May 26, 1953

2,639,935

UNITED STATES PATENT OFFICE 2,639,935

GARDEN TOOL

William K. Foulke, Minneapolis, Minn.

Application March 10, 1948, Serial No. 14,092

5 Claims. (Cl. 294—50.8)

This invention has relation to a garden tool.

An object of the invention is to provide a planting and transplanting garden tool which will be of new and improved construction.

A further object is to provide a garden tool adapted to be especially useful for the purpose of planting and transplanting seedlings, root growths, etc., which will accomplish this purpose without disturbing the root structure being moved and without causing any movement or displacement of the soil immediately surrounding said root structure.

And a further object is to provide a garden tool constituted as a planting and transplanting device incorporating features and characteristics of construction adapted to render spade elements of said garden tool readily and easily forcible into the ground in response to expenditure of but a minimum of effort.

In the accompanying drawing forming a part of this specification,

Figure 1:
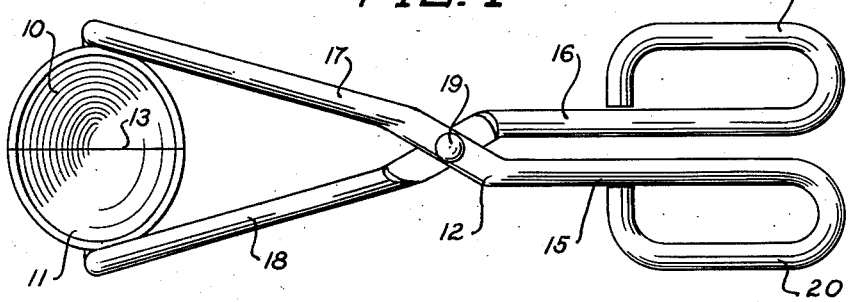
Fig. 1 is a top plan view of a garden tool made according to the invention.
Figure 2:
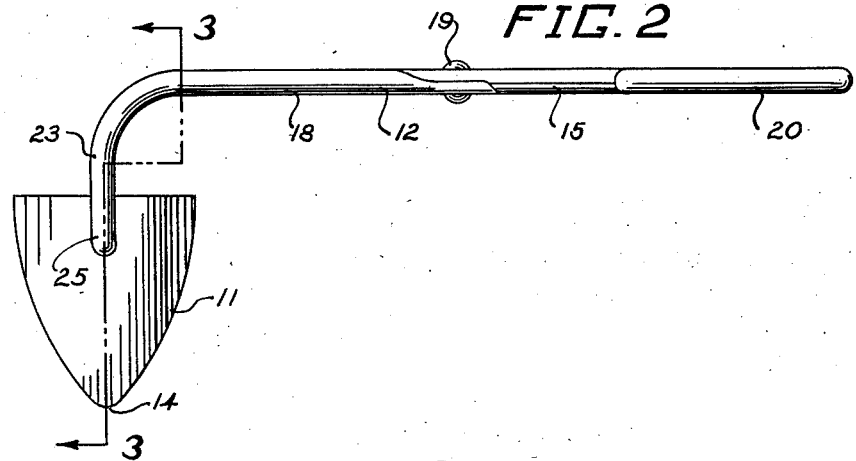
Fig. 2 is a side elevational view of the garden tool.
Figure 3:
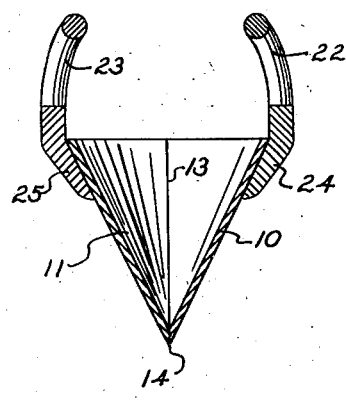
Fig. 3 is a detail sectional view, taken on line 3—3 in Fig. 2.

Speaking generally, the new and improved garden tool which the invention presents consists of oppositely disposed, complemental spade elements, denoted 10 and 11, respectively, and supporting and manipulating means for said spade elements. In the disclosure as made, the supporting and manipulating means is constituted as tongs 12 having interior portions of its interior legs integrally or rigidly, separately and independently secured to said oppositely disposed, complemental spade elements.

Exterior legs of the tongs 12 are denoted 15 and 16, respectively, interior legs of said tongs are indicated 17 and 18, respectively, a pivot pin connecting said exterior and interior legs is designated 19, and handles upon the free end portions of the exterior legs 15 and 16 are represented 20 and 21, respectively. The interior legs 17 and 18 include lengths thereof in adjacent relation to the pivot pin 19 substantially in the plane of the exterior legs 15 and 16, and said interior legs also include lengths 22 and 23 thereof in remote relation to said pivot pin which extend downwardly substantially in perpendicular relation to the plane of said exterior legs 15 and 16.

Interiorly and downwardly extending lower end portions 24 and 25 of the lengths 22 and 23 are welded, or otherwise secured, to midportions of upper outer circumferential surfaces of the spade elements 10 and 11, respectively. More explicitly stated, the interiorly and downwardly extending lower end portion 24 of the length 22 is secured to a portion of the upper outer circumferential surface of the spade element 10, and the interiorly and downwardly extending lower end portion 25 of the length 23 is secured to a portion of the upper outer circumferential surface of the spade element 11.

The complemental spade elements 10 and 11 are of duplicate construction. Each spade element is constituted as a segment of a right circular cylinder, and is constructed of relatively thin rigid material, such, for example, as steel. Said spade elements are secured to end portions 24 and 25 of the tongs 12 in such manner and position that the axes of the right circular cylinders of which they are a part will each lie in a plane perpendicular to the plane of exterior legs 15 and 16 of the tongs, and so these axes will intersect each other. Cutting edges 13, 13 of each of the spade elements 10 and 11 lie in planes perpendicular to the plane of said exterior legs 15 and 16 and passing through the axis of the pivot pin 19. The construction and arrangement are such that when the tongs 12 are closed, the cutting edges 13, 13 of the spade elements 10 and 11 will be contiguous with each other. The cutting edges 13, 13 of each spade element extend downwardly and inwardly and merge at an outer end of the spade element in a cutting point 14. The cutting points 14 of the spade elements 10 and 11 will also be in contact with each other when the tongs are closed.

In practical use of the garden tool, the handles 20 and 21 will be spread apart to cause the cutting edges 13, 13 with cutting points 14 of the different spade elements to be spread apart, and said spade elements while retained in spaced apart relation will be forced vertically into soil, surrounding or not surrounding a seedling, a root growth, etc., as the case may be. During the forcing of the spade elements into soil the handles of the tongs will be grasped by the fingers of one hand and the other hand will be utilized to exert effort in downward direction against the interior legs 17 and 18 of said tongs.

Inasmuch as the spade elements 10 and 11 extend interiorly and downwardly, the downwardly exerted effort upon said spade elements will cause these to be moved interiorly toward each other as well as downwardly. Concurrently with the application of downwardly exerted effort upon the spade elements, the handles 20 and 21 will be manually urged toward each other to forcibly cause the lower end portions of the lengths 22 and 23 of the interior legs of the tongs to be moved interiorly, as well as downwardly. It will be obvious that effort exerted upon said spade elements, in the manner as set forth, to cause them to be forced interiorly as well as downwardly, can be applied in such manner as to produce a resultant force active upon each spade element in direction parallel to the axis of said right circular cylinder of which the spade element is a segment. Each of the spade elements will, therefore, be caused to move into the soil in such a manner that every point on the element will be moving parallel to said axis. It is obvious that once the cutting points 14 and the cutting edges 13, 13 have severed the soil, there will be no further distortion of the soil, because parts of the spade elements following said points and edges will move through precisely the same space as did the points and edges.

Downward movement of the spade elements in soil of course will cause the cutting edges 13, 13 with cutting points 14 of the different spade elements to be moved progressively toward each other, and when said cutting edges with cutting points of said different spade elements have come into adjacent or contiguous relation, soil to be dug from the ground, containing or not containing a seedling, root growth, etc., as the case may be, will be enclosed by said spade elements and can be lifted and transported and replaced at any intended location. Soil enclosed by the spade elements can be deposited in other soil merely by pressing said spade elements into said other soil and spreading them apart as the tool is lifted out of the soil.

It will be apparent that the cutting edges 13, 13 with cutting points 14 of the different spade elements will become contiguous in response to forcing said spade elements down into soil a shorter distance when the cutting points are initially set closer to each other than when the spade elements are initially set farther apart. Stated otherwise, the distance the cutting points 14, 14 are initially spaced apart predetermines the depth to which the spade elements will be penetrated into the ground when in properly enclosed relation to a mass of soil to be removed.

Attention is called to the fact that the interior legs of the tongs are assembled with the spade elements in such manner as to provide a wide open space above said spade elements for freely receiving foliage or plant growths of seedlings, etc.

What is claimed is:

1. A garden tool comprising first and second, complemental spade elements each constituted as a part-cylindrical wall which is situated in a single circumference in direction transversely thereof, is straight in longitudinal direction, tapers regularly in longitudinal direction from an inner portion to an outer end portion thereof and terminates at its interior side in spaced apart cutting edges which terminate at their outer ends in a cutting point, and means fixedly, separately supporting said first and second complemental spade elements for movement away from and toward each other in a single plane with the part-cylindrical walls constituting said first and second, complemental spade elements, respectively, extending interiorly and downwardly at substantially equal angular relation to the plane in which the first and second, complemental spade elements are relatively movable and the cutting edges and cutting points of the first and second, complemental spade elements, respectively, in facing, substantially alined relation.

2. A garden tool comprising first and second, complemental spade elements each constituted as a part-cylindrical wall which is situated in a single circumference in direction transversely thereof, is straight in longitudinal direction, tapers regularly in longitudinal direction from an inner portion to an outer end thereof and terminates at its interior side in spaced apart, substantially parallel cutting edges which terminate at their outer ends in a cutting point, and means fixedly, separately supporting said first and second, complemental spade elements for movement away from and toward each other in a single plane with the part-cylindrical walls constituting said first and second complemental spade elements, respectively, extending interiorly and downwardly at substantially equal angular relation to the plane in which the first and second, complemental spade elements are relatively movable and the cutting edges and cutting points of the first and second complemental spade elements, respectively, in facing, substantially alined relation.

3. The combination as specified in claim 1 wherein said means is constituted as tongs having interior legs thereof assembled with said first and second, complemental spade elements, respectively, and exterior legs thereof provided with handles.

4. The combination as specified in claim 1 wherein said means is constituted as a pair of legs having exterior portions thereof connected together for relative movement of the pair of legs away from and toward each other and interior portions thereof secured to said first and second, complemental spade elements, respectively.

5. In a garden tool, the combination with a tongs having a pair of exterior legs pivotally connected to each other for movement in a plane and a pair of interior legs each constituted as an extension of one of said exterior legs from said pivot point, said interior legs having end portions spaced from said pivot point extending in a generally downward direction at right angles to said interior legs, of a pair of complemental spade elements constituted as identical segments of right circular cylinders each spaced equally from said pivot point and rigidly connected with one of said end portions to have a concave surface thereof facing a concave surface of the other of said spade elements and each having a continuous cutting edge extending from a top corner of said spade element to a second top corner thereof, said cutting edge lying in a plane passing through said pivot point and perpendicular to said plane of movement of said exterior legs, the axis of each of said right circular cylinders of which said spade elements are a part lying in intersecting relation to the other axis and lying in a plane perpendicular to said plane of movement of said exterior legs and to said cutting edge plane to which said axis relates, said spade elements converging from below said plane of movement of said exterior legs to a point farther from and below the plane of movement.

WILLIAM K. FOULKE.

References Cited in the file of this patent
UNITED STATES PATENTS

| Number | Name | Date |
|---|---|---|
| 293,652 | Gross | Feb. 19, 1884 |
| 742,922 | Snowden | Nov. 3, 1903 |
| 973,188 | Francisco | Oct. 18, 1910 |
| 1,082,263 | Craven | Dec. 23, 1913 |
| 1,761,503 | Tonhardt | June 3, 1930 |